Nov. 13, 1923.  1,473,612
C. L. DEWEY
DECOY
Filed June 23, 1922
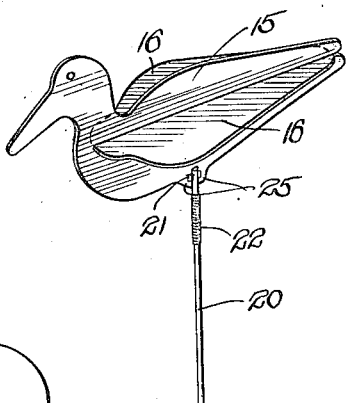
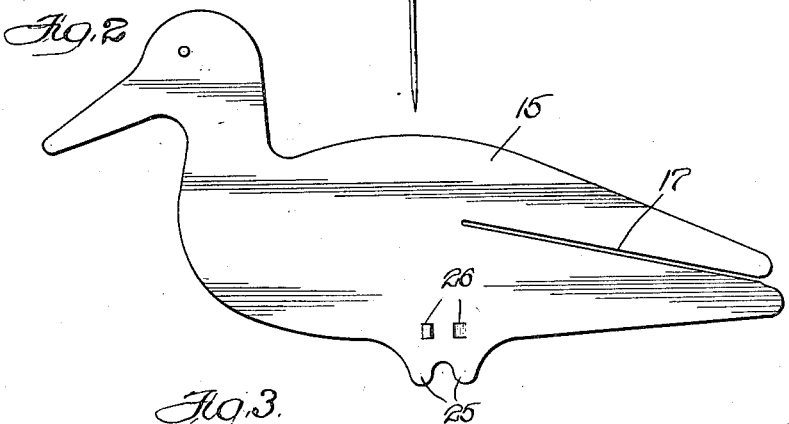
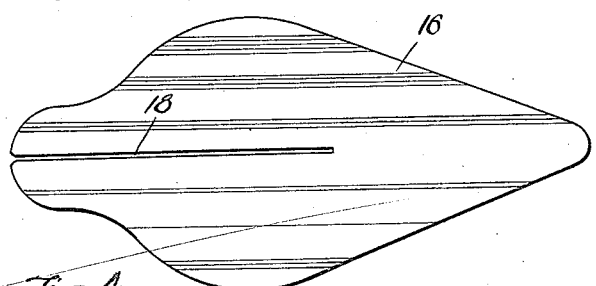
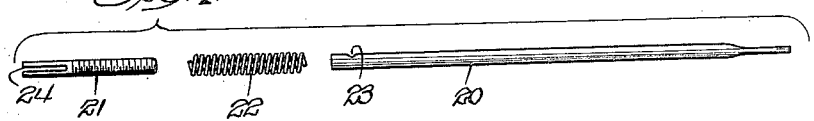
Inventor,
CLARENCE L. DEWEY
By Foree Bain & Hinkle Attys Patented Nov. 13, 1923.

1,473,612

UNITED STATES PATENT OFFICE.

CLARENCE L. DEWEY, OF CHICAGO, ILLINOIS.

DECOY.

Application filed June 23, 1922. Serial No. 570,425.

*To all whom it may concern:*

Be it known that I, CLARENCE L. DEWEY, a citizen of the United States, residing at Chicago, in the county of Cook and State of Illinois, have invented certain new and useful Improvements in Decoys, of which the following is a specification.

This invention relates to decoys.

It will be explained as applied to bird decoys.

One of the objects of the invention is to provide an improved decoy.

Another object is to provide a simple, inexpensive decoy which will simulate the appearance of the desired animal.

Another object is to provide a decoy body which may be formed from two pieces of sheet material.

Another object is to provide a bird decoy support which will cause the body to simulate bird movements to attract attention.

Another object is to provide an improved adjustable support.

Another object is to provide a bird decoy which may be readily assembled for use and readily taken apart for packing in small compass.

Other objects and advantages will hereinafter appear.

An embodiment of the invention is illustrated is the accompanying drawing, wherein—

Fig. 1 is a perspective of a bird decoy.

Figs. 2 and 3 are plans of the blanks forming the body of the bird decoy, and

Fig. 4 is an enlarged separated view of the adjustable support for the decoy.

The form of decoy chosen for the purpose of illustration is well adapted for use in the hunting of snipe.

The body of the bird is composed of two interfitting blanks 15 and 16 made from suitable material, such as sheet metal. Blank 15, which forms the generally vertical vane of the body, has its front end shaped to resemble a side view of a bird's head. This blank has an inclined slot 17 extending forwardly from its rear edge.

Blank 16, which forms the relatively horizontal vane of the bird body, has a slot 18 extending rearwardly from its front edge. This blank is so shaped that, when the two blanks are assembled, the structure simulates a bird body when viewed from any angle. Proper coloring of the blanks will assist in the simulation.

The decoy is provided with an adjustable support which allows the body to be moved by the wind to give the appearance of bird movements and to attract attention. The support comprises a rod 20 and a stem 21 interconnected by a coiled spring 22. Rod 20 may be sharpened at one end to facilitate insertion into the ground or other desired location for anchoring the decoy. The opposite end of rod 20 is inserted into the end of spring 22 and is provided with a dent or flattened area 23 which locks the spring against rotation. The other end of spring 22 fits over the threaded end of stem 21. Stem 21 is provided with a slot 24 into which blank 15 may be inserted. The blank may have a pair of projecting lugs 25 in its lower edge and small lugs 26 struck out from its sides. Lugs 25 and 26 cooperate with stem 21 to keep the decoy body in proper position on the support. The support may be removed by simply pulling the same from blank 15.

By turning stem 21 the length of laterally unsupported spring between the stem and rod 20 may be varied. The greater the distance between the stem and rod the less the spring is supported and the greater its flexibility. Screwing stem 21 into the spring makes the support less flexible. Thus the movements of the decoy body may be varied according to the strength of the wind and to suit other conditions.

The bird decoy may be easily and quickly assembled by slipping the two blanks together as previously described, and fitting the support in place. The two blanks form a relatively rigid body. The decoy may be as easily taken apart for packing by slipping the blanks apart and removing the support.

Having described my invention what I claim as new and desire to secure by Letters Patent, is:—

1. A decoy comprising a body; and a support having a coiled spring adjustable as to effective length to vary the flexibility of the support.

2. A decoy comprising a body, a stem attachable to the body, a rod, and a coiled spring interconnecting the stem and rod and adjustable thereon as to effective length.

3. A decoy comprising a body composed of two interfitting relatively thin sheets; and a support having two members one of which is slotted to receive one of the body forming sheets, and a coiled spring interconnecting the two members and adjustable thereon to vary its flexibility.

In testimony whereof I hereunto subscribed my name.

CLARENCE L. DEWEY.